May 17, 1960 H. W. LORD 2,937,331

MAGNETIC AMPLIFIER

Filed April 19, 1954 4 Sheets-Sheet 1

Inventor:
Harold W. Lord,
by Paul A. Frank
His Attorney.

May 17, 1960 H. W. LORD 2,937,331

MAGNETIC AMPLIFIER

Filed April 19, 1954 4 Sheets-Sheet 2

Inventor:
Harold W. Lord,
by Paul A. Frank
His Attorney.

May 17, 1960 H. W. LORD 2,937,331

MAGNETIC AMPLIFIER

Filed April 19, 1954 4 Sheets-Sheet 3

Inventor:
Harold W. Lord,
by Paul A. Frank
His Attorney.

May 17, 1960 | H. W. LORD | 2,937,331

MAGNETIC AMPLIFIER

Filed April 19, 1954 | 4 Sheets-Sheet 4

Inventor:
Harold W. Lord,
by Paul A. Frank
His Attorney.

United States Patent Office 2,937,331

Patented May 17, 1960

2,937,331

MAGNETIC AMPLIFIER

Harold W. Lord, Schenectady, N.Y., assignor to General Electric Company, a corporation of New York Application April 19, 1954, Serial No. 424,019

25 Claims. (Cl. 323—89)

My invention relates to magnetic amplifiers and, more particularly, to self-saturating type magnetic amplifier circuits whose electrical output characteristic is "full wave" and is controllable in response to a unidirectional or alternating input signal and in particular is responsive to a pulsating or "half wave" input signal voltage.

In electric control systems using several stages of magnetic amplification in cascade, it is often advantageous to employ half wave responsive preamplifying stages before the final output stage, thereby halving the number of magnetically saturable cores and associated circuitry required per stage of preamplification. This results not only in a considerable saving in expense and size of the equipment, but also insures that the resulting circuit will have fast speed of response per stage, i.e., will produce a change in output electrical energy upon a change in input signal level within a half-cycle of the alternating source current. In many applications, however, the asymmetrical nature of the resulting rectified half wave output is intolerable, and it is required or desirable that the final output stage of the system should deliver full wave current or voltage to the electrical load device. This raises several difficult problems. Most conventional full wave magnetic amplifier circuits require a full wave input signal for proper operation. If a filter is employed to convert the pulsating half wave input signal into a substantially constant unidirectional signal, the speed of response of the control system to changes in input signal level is usually impaired.

Accordingly, a principal object of my invention is to provide a magnetic amplier circuit capable of delivering full wave output electrical energy to a load device in response to an input pulsating or half wave signal current. It is a further object of the invention to provide such half wave to full wave magnetic amplifier circuits which have high speed of response, ordinarily within one half-cycle of the frequency of the alternating source, to changes in input signal level.

A still further object of the invention is to provide a full wave self-saturating magnetic amplifier circuit operative in response to a half wave input signal and yet capable of delivering substantially identical wave forms of electrical energy to an output load during both polarity alternations of an alternating power source.

A still further object of the invention is to provide a full wave magnetic amplifier circuit operative in response ot half wave input signals and having a wide output current control characteristic from full-off to full-on.

In general, in accord with the invention, a half wave self-saturating type magnetic amplifier is provided, and a saturable inductor is coupled with the saturable reactor of the magnetic amplifier independently to deliver current to the output load device to be controlled. When connected in this manner, the saturable inductor is found to act as a "slave" to the controlled saturable reactor of the half wave magnetic amplifier circuit such that it delivers a substantially identical wave form of current to the load during the non-conducting or inverse half-cycles of the magnetic amplifier as that delivered to the load by the magnetic amplifier during its conducting half-cycle. The load thus receives fairly symmetrical full wave currents which vary in accord with the signal supplied to the control winding of the half wave magnetic amplifier. This slave type control action of the separate inductor is found to result from the fact that the flux density in the core of the slave inductor is reset during the conducting or forward half-cycle of the controlled saturable reactor by the same amount as that set by the input signal supplied to the controlled reactor. More specifically, the volt-time area that the slave inductor holds back the current delivered to the load during its operative half-cycle is determined by flux reset of the inductor core caused by the coupling thereto of a voltage wave corresponding to the volt-time area that the saturable reactor holds off the current during its operative half-cycle as a result of the input signal. The coupling circuit for producing this slave action in the saturable inductor is preferably made unilateral so that the operation of the slave inductor does not influence or override the control exercised upon the controlled saturable reactor by the input signal.

In accord with a further feature of the invention, for those applications where an output current control characteristic from full-off to full-on is desired, a compensating circuit is provided which delivers a pulse of current through the load which opposes and compensates for the minimum current delivered to the load during the conducting periods of the half wave self-saturating magnetic amplifier portion of the circuit. In order to achieve a full, unimpeded, maximum current from the circuit at the other end of the control range, a positive feed-back winding and circuit is preferably associated with the slave inductor of the resultant circuit.

The manner by which the slave inductor is coupled to the saturable reactor of the half wave self-saturating magnetic amplifier portion of the circuit may, of course, take many forms. In one form, the gate winding of the separate saturable slave inductor is merely connected in parallel with the saturable reactor gate winding and rectifier of the half wave magnetic amplifier. In another embodiment a separate coupling or "induced-control" winding is provided upon the saturable reactor of the half wave magnetic amplifier and connected in series with the gate winding of the slave inductor through an additional rectifier. In yet another embodiment a voltage proportional to a half-cycle of the alternating source voltage minus the voltage developed across the load is supplied to a separate control winding of the slave inductor to control its slave action indirectly in accord with the magnitude of the voltage drop across the saturable reactor gate winding during the conducting half-cycle period of the half wave magnetic amplifier.

The word "reactor" is used herein to connote an inductive reactance element having means associated therewith for controlling the reactance characteristic thereof, while the word "inductor" is used to connote an inductive reactance element.

The novel features believed characteristic of the invention are set forth in the appended claims. The invention itself, however, together with further objects and advantages thereof, may best be understood by referring to the following description taken in connection with the accompanying drawing, in which:

Figure 4:
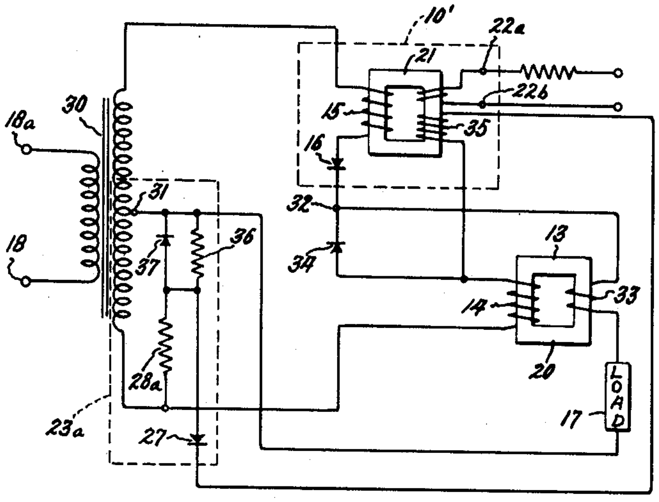
Fig. 4 is a circuit diagram of another embodiment of the invention wherein undirectional full wave current is supplied to a load device controllable in accord with a half wave input signal.
Figure 6:
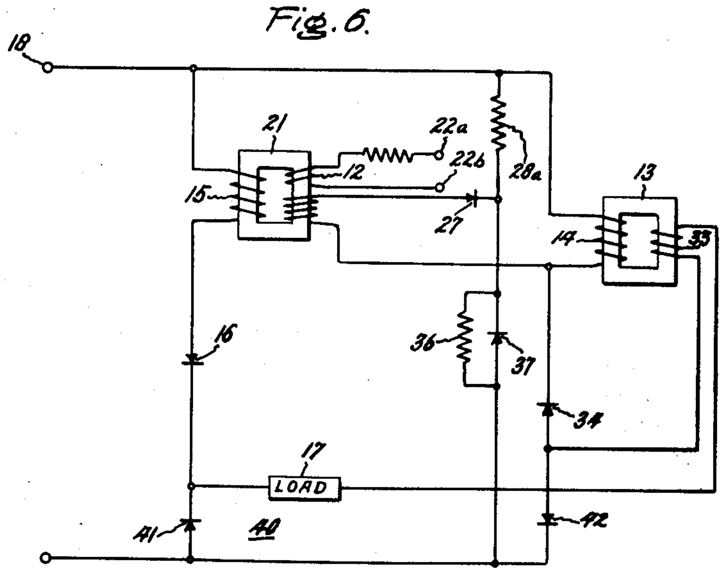
Figure 7:
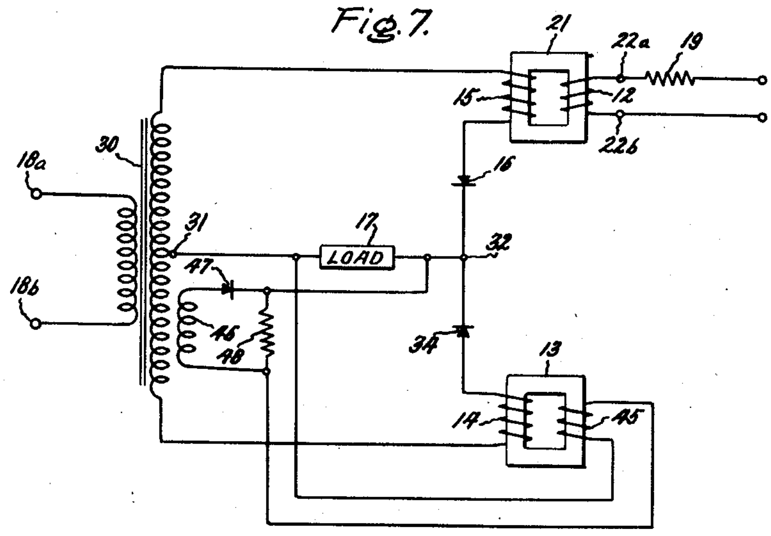

Fig. 6 is a circuit diagram of another embodiment of the invention wherein undirectional full wave current is supplied to a load varying in accord with a half wave input signal, but which differs from the magnetic amplifier of Fig. 4 in that it is arranged for connection to a two-terminal source of alternating current power rather than a three-terminal power source; and Fig. 7 is another magnetic amplifier circuit embodying the invention in which unidirectional full wave current is supplied to a load device varying in accord with a half wave input signal but which receives the signal for controlling the slave inductor from the voltage developed across the load rather than from the voltage developed across the gate winding of the controlled saturable reactor of the circuit. In the drawings, corresponding components of each circuit are designated by similar reference numerals.

Figure 1:
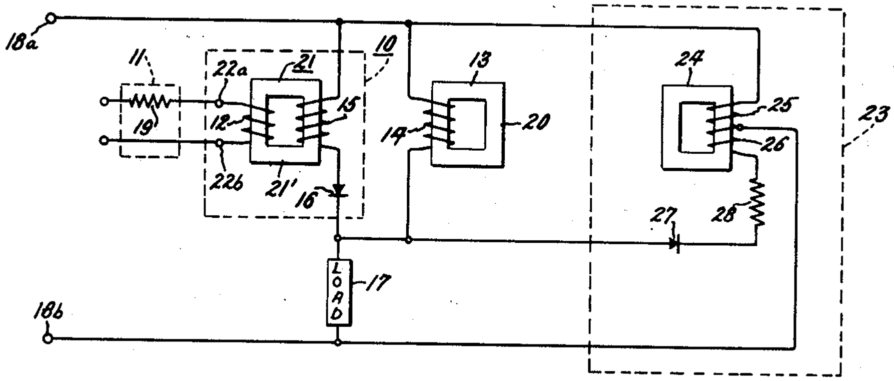
Fig. 1 is a circuit diagram of a full wave magnetic amplifier control apparatus embodying the invention which delivers full wave alternating current to a load device controllable in accord with a half wave input signal.

Referring now to Fig. 1, a full wave magnetic amplifier circuit embodying the invention is shown in one form as comprising a half wave self-saturating magnetic amplifier component 10, means for providing a non-loading input signal such as an induced-current-limiting impedance network 11 connected to the input terminals 22*a* and 22*b* of a control winding 12 of magnetic amplifier 10, and a separate saturable inductor 13 having its gate winding 14 connected in parallel with the gate winding 15 and rectifier 16 of magnetic amplifier 10. A load device 17 is connected in series with the parallel connected gate windings 14 and 15 across a pair of alternating power input terminals 18*a* and 18*b* adapted for connection to a power source of alternating current. The magnetic core 20 and gate winding 14 of the saturable inductor 13 is preferably made nearly identical to the magnetic saturable core 21' and gate winding 15 of the magnetic amplifier reactor 21. However, so long as it has equal or more turns and equal or greater core area of the same type of core material, the saturable inductor 13 will perform satisfactorily. Induced-current-limiting impedance network 11 may be any circuit or signal source which does not load or draw induced current from control winding 12. It may, for example, be a simple high resistance element 19 as shown, or may take the form of other types of current-limiting networks such as an inductor or other combinations of impedances such as rectifiers in conjunction with parallel or series connected alternating voltage sources.

Figure 2:
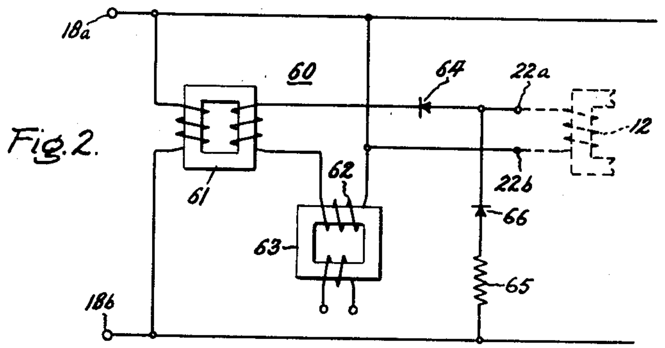
Fig. 2 is a circuit diagram of a conventional half wave stage of magnetic preamplification capable of delivering a suitable current-limited half wave input signal of proper time phase phase and polarity to the control apparatus of Fig. 1.

Referring to Fig. 2, the current limited input control signal may be supplied from a previous stage of half wave magnetic amplification 60 to input terminals 22*a* and 22*b*, and thence to control winding 12 of the saturable reactor 21 of the half wave magnetic amplifier component 10. Half wave preamplifier 60 comprises a transformer 61 whose primary is connected across the alternating current source terminals 18*a*, 18*b*, and whose secondary is connected in series with the gate winding 62 of a saturable reactor 63 and with a power rectifier 64 across input signal terminals 22*a*, 22*b* of magnetic amplifier component 10. Rectifier 64 is poled to deliver under the control of its associated reactor 63 a half wave signal to control winding 12 of reactor 21 during the "reset" half-cycle period that rectifier 16 of magnetic amplifier component 10 blocks the current to load 17. A half wave bias circuit comprising resistor 65 and rectifier 66 connected in series with control winding 12 across the alternating current line functions to prevent the flow of currents induced in winding 12 during the half-cycle conduction period of rectifier 16 and thus constitutes an induced-current-limiting impedance network 11. This network 11 is not essential to the operation of the control apparatus of the invention but is highly desirable in order to maximize sensitivity and range of control obtainable.

In accord with a further feature of the invention, a compensating circuit 23 is included in the full wave magnetic amplifier circuit of Fig. 1 in order to permit a more nearly complete current cut-off through load 17 when the saturable reactor 21 is controlled to its minimum current transmitting condition. The magnetic amplifier circuit of Fig. 1 is, of course, still operative but to a lesser controllable extent, even without compensating circuit 23. Compensating circuit 23 comprises a transformer 24 having its primary winding 25 connected across alternating supply current terminals 18 and its secondary winding 26 connected in series with load 17 through a rectifier 27 and a resistance 28. Rectifier 27 is poled to pass current through load 17 during the same alternation that rectifier 16 allows current to pass to load 17 through gate winding 15 of saturable reactor 21. The currents passing through the load in these two branches, however, are in phase opposition. Resistance 28 is adjusted to have a value such that the average current flowing through load 17 and rectifier 27 exactly compensates and counteracts the average current flowing through load 17 from the gate winding 15 and rectifier 16 of magnetic amplifier 10 when the reactor 21 is controlled to its minimum current passing condition. As will be more fully explained hereinafter, because of this reduction of the minimum current flowing through load 17 upon a suitable control signal supplied to the control winding of saturable reactor 21, the slave inductor 20 passes only exciting current to load 17 during the periods of non-conduction of the circuit branch including the gate winding 15 of the saturable reactor. The range of control of the output current delivered to load 17 is thus increased from slave inductor exciting current only at cut-off to a maximum current condition determined by the impedance of the load device, the forward resistance of rectifier 16 and the air core inductances of gate windings 14 and 15.

Figure 3:
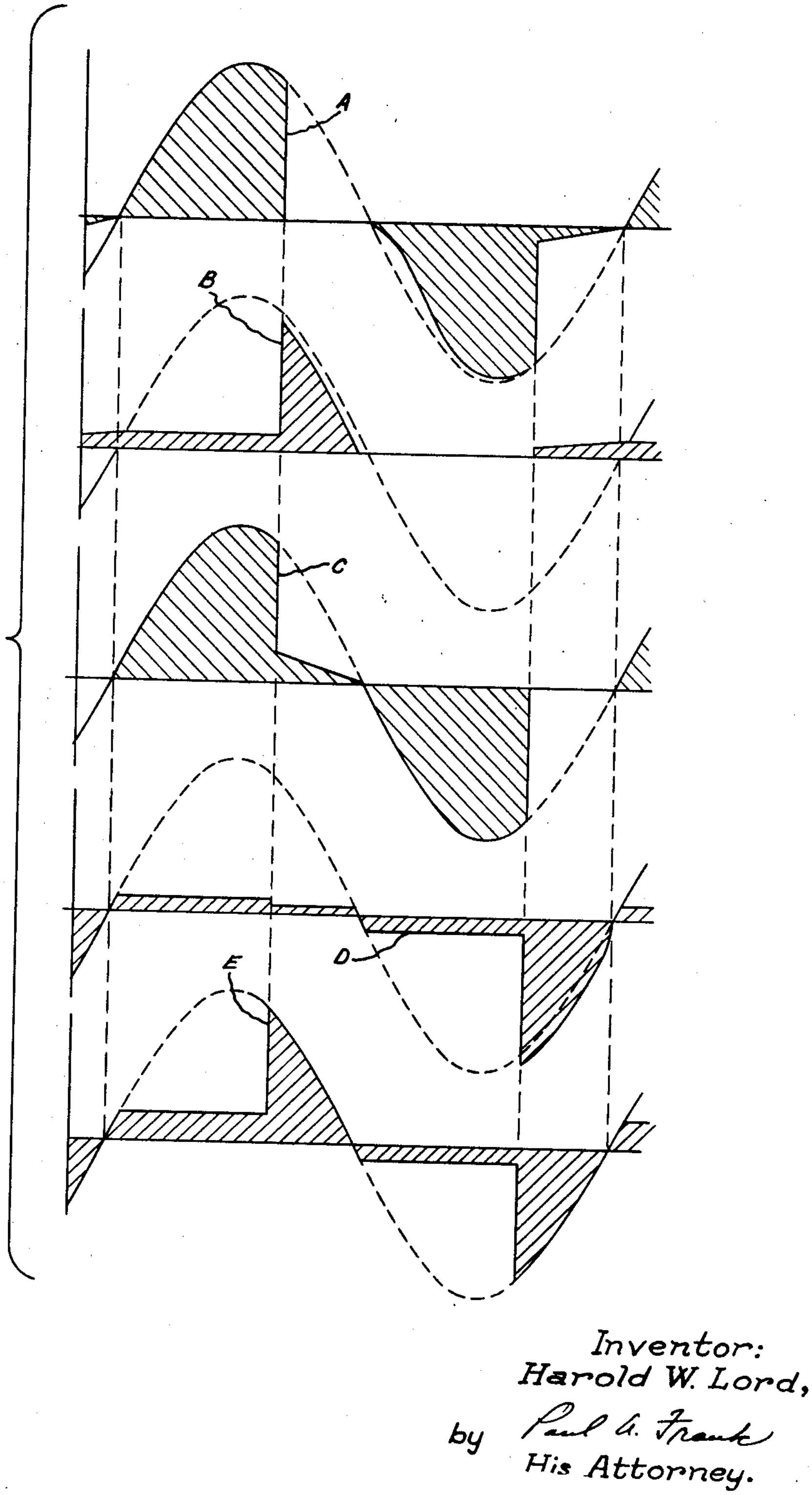
Fig. 3 is a group of current and voltage curves plotted upon corresponding time bases illustrative of the operation of the magnetic amplifier circuit of Fig. 1.

The operation of the full wave magnetic amplifier circuit of Fig. 1 may be easily understood by referring to the wave forms of Fig. 3. In each of the waves of Fig. 3, the sinusoidal envelope represents a single cycle of alternating voltage supplied to the alternating current power input terminals 18. Wave form A represents the voltage across the gate winding 15, wave form B represents the current through gate winding 15, wave form C represents the voltage developed across gate winding 14 of saturable inductor 13, wave form D represents the current flowing through gate winding 14 while wave form E represents the current delivered to load 17 through both gate windings 14 and 15. All of the wave forms are shown for a condition wherein the input signal current delivered to control winding 12 of saturable reactor 21 has a magnitude near the middle of the control range of the reactor. As can be seen from the wave form A, the voltage across saturable reactor gate winding 15 follows the source voltage wave for approximately 120 degrees of the positive polarity alternation at which point the reactor 21 reaches saturation due to the magnetic flux conditions established in the core thereof by the half-cycle pulse of signal voltage delivered to control winding 12 of the reactor 21 during an immediately preceding half-cycle. Due to the induced current limiting network 11 in the control circuit, substantially no currents flow due to voltages induced therein by the change in flux density occurring during the hold-off period from the start of the conduction half-cycle of rectifier 16 until the reactor fires. The voltage across gate winding 15 drops rapidly as the core fires, and load current flows through the gate winding 15, as shown by curve B. During the negative polarity half-cycles, the voltage again builds up across the gate winding 15 in an opposite direction to an extent determined by the input resetting signal but no current flows due to the presence of rectifier 16.

Referring now to wave form C, it will be seen that the voltage across gate winding 14 of saturable inductor 13 likewise builds up and follows the source voltage alternation during the positive polarity half-cycles and drops rapidly when the saturable reactor 21 of magnetic amplifier 10 fires, since the inductor winding 14 is connected in parallel with the branch circuit including reactor gate winding 15. Saturable inductor 13 however does not fire, since no control signal is supplied directly thereto and it has not been driven into saturation. Relatively little current is therefore supplied to load 14 through the gate winding of saturable inductor 13 during the positive voltage alternations as shown by wave form D. The current delivered to load 17 during such positive voltage alternations is thus primarily determined by the current flowing through the gate winding 15 of saturable reactor 21 as indicated by wave form E.

During negative polarity alternations of the source current, the voltage again builds up in an opposite direction across gate winding 14 of inductor 13 as shown by wave form C but during this alternation the core is now driven into saturation at approximately the same firing angle, with respect to the start of this negative polarity alternation, that the core of reactor 21 reached saturation during the immediately preceding positive polarity alternation. This is because the magnetizing influence of the voltage and current associated with gate winding 14 during the positive alternation functions to reset or readjust the flux density of the saturable core 20 of inductor 13 to a magnetic operating point such that the core 20 reaches saturation after a hold-off period whose area is equal to the volt-time hold off area of the preceding half-cycle. As a consequence, a pulse of negative going current is delivered to load 17 during the negative polarity alternation of the source current as indicated by wave form D. The resulting full wave alternating current delivered to load 17 is indicated by wave form E.

Both saturable reactor 21 and inductor 13 are constructed to have sufficient core area and turns of their gate windings 14 and 15 such that the flux density peaks in the core are below the knee of the magnetization curve when connected across the alternating current supply. With the inductor 13 alone connected in series with the load and the alternating current supply, the only current which flows through the load is the exciting current of the inductor. However, with the half wave self-saturating magnetic amplifier circuit comprising gate-winding 15 and rectifier 16 connected in parallel with gate winding 14 of inductor 13, the current to the load at any instant is the algebraic sum of the instantaneous currents through both gate windings 14 and 15. The control circuit of the magnetic amplifier can then vary the amount of current which flows through the load during the half-cycles of such polarity that rectifier 16 passes current. During the alternations of opposite polarity, inductor 13 automatically passes the correct amount of current to make the average voltage across the load equal to zero for each whole cycle of operation. Since the magnetic flux level in the core 20 of inductor 13 which causes it to saturate and draw the proper current is set during the half-cycle that the magnetic amplifier rectifier 16 conducts, the speed of response of the combined circuit is the same as that of the half wave magnetic amplifier portion alone.

An adjustable control of the full wave current delivered to load 17 is thus accomplished by merely supplying half wave current pulses to control winding 12 of reactor 21 in a direction to hasten the magnetization of core 21 relative to the point of saturation with no control signal supplied. The use of a high impedance element 19 or other induced-current-limiting impedance in the input circuit of control windings 12 is desirable in order to prevent distortion of the voltage wave developed across gate winding 15 as a result of induced currents in the control winding.

As mentioned above, it is found in practice that inductor 13 and saturable reactor 21 do not cut off the load current at the minimum output point of the control characteristic. Compensating circuit 23 is thus provided for reducing the load current minimum. In compensating circuit 23, the compensating effect is provided by a source of alternating voltage from a secondary winding 26 of transformer 24 which passes current in one direction through load 17, rectifier 27 and resistor 28. Resistor 28 is adjusted so that the rectified average current in this circuit is approximately equal to that through rectifier 16 when the half wave magnetic amplifier 10 is controlled to its minimum output point on its control characteristic. The secondary winding 26 is so polarized with respect to the alternating current source that both rectifiers 27 and 16 conduct during the same alternation of source current.

Referring now to Fig. 4 I have shown another embodiment of the invention in the form of a magnetic amplifier circuit which delivers full wave unidirectional current to a load device in response to a half wave control signal rather than full wave alternating load current as provided by the circuit of Fig. 1. The circuit of Fig. 4 also includes a number of refinements and improvements over the magnetic amplifier circuit shown in Fig. 1.

In the magnetic amplifier of Fig. 4 the alternating current power supply is derived from a center tapped transformer 30. The load device 17 is connected between the center tap 31 of transformer 30 and a common output terminal 32 of half wave self-saturating magnetic amplifier component 10′ through a current feedback winding 33 provided on the saturable core 20 of inductor 13. Gate windings 14 and 15 are connected to opposite ends of the secondary of the center tapped transformer 30. An additional power rectifier 34 is connected in series with gate winding 14 of saturable inductor 13 and common output terminal 32 and is polarized to deliver current through load 17 in the same direction as that delivered by the half wave magnetic amplifier load circuit comprising gate winding 15 and rectifier 16. Coupling between the control saturable reactor 21 and the slave saturable inductor 13 is accomplished by the use of a coupling winding 35 on saturable reactor 21 preferably having the same number of turns as the gate winding 15. Coupling winding 35 is connected across gate winding 14 of inductor 13 through a compensating circuit **23*a* comprising rectifier 27 and resistor 28*a* together with a D.-C. bias source comprising resistor 36 and by-pass rectifier 37 connected in parallel with one half of the secondary winding of transformer 30 through resistor 28*a***.

Figure 5:
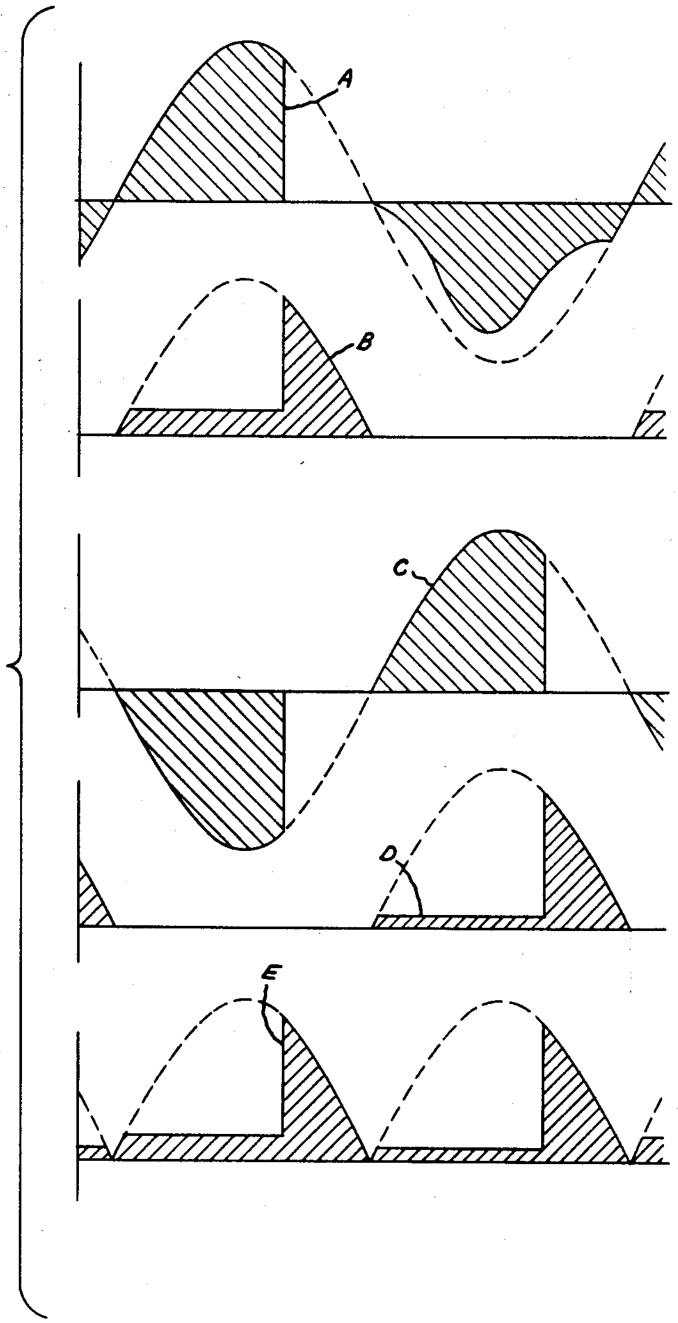
Fig. 5 is a group of curves similar to those of Fig. 2 but illustrative of the operation of the magnetic amplifier circuit of Fig. 4.

The various voltage and current wave forms associated with gate windings 14 and 15 and load 17 of the magnetic amplifier of Fig. 4 are illustrated in Fig. 5. The wave forms are in general similar to those illustrated in Fig. 3 with the exception that there is a reversal in polarity of the voltage and current developed across the saturable inductor winding 14 such that the load receives unidirectional current pulses rather than alternating current pulses. The magnetic amplifier of Fig. 4 also provides a more symmetrical output wave form during both polarity alternations of the source current and has a somewhat wider range of control than the magnetic amplifier of Fig. 1 as a result of the various above-specified refinements in the circuitry. The use of a separate coupling winding 35 to deliver an induced voltage controlling the reset of the slave reactor 13 eliminates any resistive drop effects in the reset signal applied from the control reactor 21 to the slave inductor 13. The positive current feedback circuit including feed back winding 33 eliminates the undesirable tendency of the back leakage of rectifier 34 to prevent the reactor 13 from passing full unrestricted current to load 17 when the control magnetic amplifier reactor 21 is controlled to its full-on condition. The additional magnetizing force derived from the feedback winding 33 holds core 20 in complete saturation under such conditions. The half wave compensating bias circuit 23*a* functions to deliver a half-cycle of sinusoidal voltage to inductor winding 14 during the conducting period of rectifier 16 and to prevent loading of coupling winding 35. More specifically, rectifier 27 prevents induced currents in the circuit of coupling winding 35 during the non-conducting period of rectifier 16 while rectifier 37 prevents an inductive "kick back" reset of reactor 21 during this period. Resistor 28*a* limits the current through rectifier 37 so that the voltage across rectifier 37 in the conducting direction is small compared with that across the resistor 28*a*.

Referring now to Fig. 6 there is shown another magnetic amplifier circuit similar to that of Fig. 4 but adapted for connection to a two-terminal alternating current source rather than the three terminal source provided by the center tap transformer 30. The load 17 is connected as a diagonal of a bridge type full wave rectifier 40 which includes additional balancing arm rectifiers 41 and 42 which, together with rectifiers 16 and 34, constitute the bridge circuit. The remainder of the circuit is substantially identical with that of the magnetic amplifier of Fig. 4 and corresponding components have been designated by similar reference numerals. The operation of this magnetic amplifier is the same as that described above in connection with the magnetic amplifier of Fig. 4.

Referring now to Fig. 7 there is shown a further embodiment of my invention in the form of a magnetic amplifier circuit similar to that described above in connection with Fig. 4 but incorporating a different circuit for coupling the slave inductor 13 to the controlled saturable reactor 21. In the magnetic amplifier of Fig. 7 the slave inductor 13 is provided with a magnetic saturation control winding 45 and is connected to receive a reset signal voltage proportional to the voltage developed across gate winding 15 of the controlled saturable reactor 21 through a type of voltage control circuit to be described hereinafter. Load 17 is directly connected between the common output terminal 32 of the magnetic amplifier and the center tap 31 of the input transformer 30. The slave reactor controlling signal is developed by connecting winding 45 in series with a half-cycle voltage generating circuit comprising a tertiary winding 46 of transformer 30, rectifier 47 and a voltage developing resistor 48. This half-cycle voltage generating source is connected in series with the load resistance 17 and thus supplies a composite voltage signal to saturable inductor control winding 45 which is equal to the half-cycle voltage pulse developed across resistor 48 minus the voltage developed across load resistance 17 as a result of load current pulses therethrough. Tertiary power winding 46 and rectifier 47 are so polarized that a half wave of current flows through resistor 48 during the same period that rectifier 16 of half wave magnetic amplifier 10 delivers current to load 17. A voltage is thus developed across load 17 which is similar to the wave form of the current pulse shown in the positive alternation of the wave form E of Fig. 3. This load-developed voltage wave is instantaneously subtracted from the sinusoidal half-cycle of voltage developed across the load 48 such that the control winding 45 receives a reset voltage during this conducting period of half wave magnetic amplifier component 10 which is proportional to the voltage wave form developed across gate winding 15 of the half wave magnetic amplifier component 10 and also similar to the slave inductor resetting voltage wave form C of Fig. 5. The slave inductor 15 of the full wave magnetic amplifier circuit of Fig. 7 thus receives a substantially identical resetting signal during the conducting alternation of half wave magnetic amplifier component 10 as that described above in connection with the circuit of Fig. 4 and both full wave magnetic amplifier circuits operate in a similar manner.

Although I have described above a number of specific magnetic amplifier circuits embodying the invention, many modifications may be made. It is to be understood, therefore, that I intend by the appended claims to cover all such modifications as fall within the true scope and spirit of the invention.

What I claim as new and desire to secure by Letters Patent of the United States is:

1. Control apparatus for delivering full wave current to a load in response to half wave input signals comprising, a saturable reactor having a gate winding and a control winding, means connected in series with said control winding for reducing currents induced therein by changes in magnetic flux conditions within said reactor, a saturable inductor having a gate winding, input terminals for connection to a source of alternating current, circuit means for connecting an electric load in circuit with both gate windings across said input terminals to receive the algebraic sum of currents flowing through both gate windings, a rectifier connected in series with said saturable reactor gate winding, and circuit means coupling said reactor with said inductor for controlling the voltage developed across the inductor gate winding in accord with the voltage developed across the reactor gate winding during the conducting period of said rectifier.

2. The control apparatus of claim 1 comprising a compensating network connected in circuit with a load connected to said apparatus and including means for supplying a rectified current through the load in phase opposition to the current delivered to the load from the gate winding of said reactor.

3. The control apparatus of claim 1 wherein said saturable inductor has magnetic saturation characteristics substantially identical with said saturable reactor.

4. A magnetic amplifier circuit for delivering full wave current to an interconnected load in response to input half wave signals, comprising alternating current source terminals, a saturable reactor having a control winding and a gate winding, a saturable inductor having a gate winding, a first circuit branch comprising said reactor gate winding and a rectifier and connected across said alternating current terminals for delivering signal controlled current to an interconnected load during source current alternations of one polarity, and a second circuit branch comprising said inductor gate winding coupled with said first circuit branch and magnetically controlled in accord with the voltage developed across the reactor gate winding, said inductor gate winding being connected to deliver current to said interconnected load during source current alternations of opposite polarity.

5. A magnetic amplifier circuit for delivering full wave alternating current to a load in response to input half wave signals, comprising alternating current source terminals, a saturable reactor comprising a gate winding and a control winding, an induced current limiting impedance network connected in series with said control winding, an electric load and a rectifier connected in series with said reactor gate winding across said alternating current source terminals, and a saturable inductor including a gate winding connected in parallel with said reactor gate winding and said rectifier and in series with said load.

6. The magnetic amplifier circuit of claim 4 comprising a transformer having a primary winding circuit connected across the alternating current source terminals and a secondary winding circuit connected in circuit with said load, and a rectifier and resistor connected in series with said secondary winding circuit, said last-mentioned rectifier being polarized to pass current during the same source current alternations that the rectifier in series with the reactor gate winding passes current.

7. Magnetic control apparatus for delivering full wave unidirectional current to a load in response to half wave input control signals, comprising transformer means for transforming an alternating source voltage into two 180° out-of-phase alternating voltages, a saturable reactor having a gate winding, a control winding and a coupling winding, a first circuit branch comprising said reactor gate winding and a rectifier connected to said transformer means for delivering an input-signal-controlled current derived from one of said generated alternating voltages to an interconnected load during source alternations of one polarity, a saturable inductor having a gate winding, a second circuit branch comprising said inductor gate winding and a rectifier connected to said transformer means for delivering a current derived from the other one of said generated alternating voltages to said interconnected load during source alternations of opposite polarity, and means for coupling the voltage induced in said coupling winding with said inductor.

8. A magnetic amplifier circuit for delivering full wave unidirectional current to a load in response to half wave input electric signals, comprising a transformer having a tapped secondary winding, a saturable reactor having a control winding and a gate winding, a first load circuit branch comprising said reactor gate winding and a rectifier connected from said tap across one portion of said transformer secondary winding, a saturable inductor having a gate winding, a second load circuit branch comprising said inductor gate winding and a rectifier connected from said tap across another portion of said secondary winding, said rectifiers being poled to pass current during opposite polarity alternations of an alternating source current connected to said transformer, and circuit means including a rectifier for electrically coupling said inductor with said reactor only during the conducting period of said first load circuit branch.

9. The magnetic amplifier circuit of claim 8 comprising a feedback winding on said saturable inductor connected in series with both said load circuit branches.

10. The magnetic amplifier circuit of claim 8 comprising means for delivering a half-cycle of sinusoidal voltage to said inductor gate winding during the conducting period of the rectifier of said first circuit branch.

11. A magnetic amplifier circuit for delivering full wave unidirectional current to a load in response to half wave input electric signals, comprising a transformer having a tapped secondary winding, a saturable reactor having a control winding, a gate winding, and a coupling winding, a current limiting impedance network connected in series with said control winding, a first load circuit branch comprising said reactor gate winding and a rectifier connected from said tap across one portion of said transformer secondary winding, a saturable inductor having a gate winding, a second load circuit branch comprising said inductor gate winding and a rectifier connected from said tap across another portion of said secondary winding, said rectifiers being poled to pass current during opposite polarity alternations of an alternating source current connected to said transformer, and circuit means including a rectifier for coupling the voltage induced in said coupling winding with the gate winding of said inductor.

12. The magnetic amplifier circuit of claim 11 wherein the saturable reactor and saturable inductor have substantially identical magnetic cores and the inductor gate winding, the reactor gate winding and the reactor coupling winding all have substantially the same number of turns.

13. A magnetic amplifier circuit for delivering full wave unidirectional current to a load in response to half wave input signals, comprising a pair of alternating current source terminals, a full wave bridge type rectifier connected across said source terminals, a saturable reactor having a gate winding connected in series with one of the arms of said bridge, a saturable inductor having a gate winding connected in series with a balancing arm of said bridge, a control winding on said reactor, and circuit means including a rectifier for inductively coupling said reactor with said inductor to control the magnetic flux conditions established in said inductor in accord with the magnetic flux conditions established in said reactor during the conducting half-cycle period of said reactor gate winding.

14. A magnetic amplifier circuit for delivering full wave unidirectional current to a load in response to half wave input signals, comprising a pair of alternating current source terminals, a full wave bridge type rectifier connected across said source terminals, a saturable reactor having a gate winding connected in series with one of the arms of said bridge, a saturable inductor having a gate winding connected in series with a balancing arm of said bridge, a control winding on said reactor, an induced current limiting impedance in series with said control winding, a coupling winding on said reactor, and circuit means including a rectifier for coupling the voltage induced in said coupling winding with said inductor during source current alternations corresponding to the half-cycle conducting periods of said reactor gate winding.

15. The magnetic amplifier circuit of claim 14 wherein the saturable reactor and saturable inductor have substantially identical magnetic cores and the inductor gate winding, the reactor gate winding and the reactor coupling winding all have substantially the same number of turns.

16. Control apparatus for delivering full wave current to a load in response to half wave input signals comprising a half wave self-saturating magnetic amplifier including a saturable reactor for delivering controllable output current pulses to an interconnected load, means for generating a voltage wave proportional to said output current pulses, means for generating a half-cycle sinusoidal voltage wave during the half-cycle conducting period of said half wave magnetic amplifier, a saturable inductor connected independently to deliver current to an interconnected load, and circuit means for coupling to said inductor a voltage wave proportional to said generated half-cycle sinusoidal voltage wave minus said generated output voltage wave.

17. Control apparatus for delivering full wave unidirectional current to a load in response to half wave input signals, comprising a transformer having a tapped secondary winding, a saturable reactor having a control winding and a gate winding, a first circuit branch for delivering current to a load comprising said reactor gate winding and a rectifier connected from said tap across one portion of said transformer secondary winding, a saturable inductor having a gate winding and a control winding, a second circuit branch for delivering current to said load comprising said inductor gate winding and a rectifier connected from said tap across another portion of said secondary winding, said rectifiers being poled to pass current during opposite polarity alternations of an alternating source current connected to said transformer, and means for generating a half-cycle sinusoidal voltage during the conducting period of said first circuit branch rectifier, said inductor control winding being connected to receive a voltage wave proportional to said generated half-cycle sinusoidal voltage minus the voltage developed across the interconnected load.

18. Control apparatus for supplying full wave current from an alternating current supply circuit to a load circuit comprising a saturable reactor including a gate winding and a control winding, a rectifier, means connecting said gate winding, said rectifier and said load circuit in series and for energization from said supply circuit, means for energizing said control winding during inverse half cycles of voltage of said supply circuit to determine the portion of the forward half cycle of voltage of said supply circuit during which said reactor is saturated, a saturable inductor including a gate winding, circuit means connecting said last-mentioned gate winding in series with said load circuit and with said supply circuit and means electrically coupling said inductor with said reactor to establish a reset flux in said inductor during the forward half cycles of voltage of said rectifier dependent upon the voltage of the gate winding of said reactor during said forward half cycles.

19. Control apparatus for supplying full wave current from an alternating current supply circuit to a load circuit comprising a self-saturating reactor including a gate winding and a control winding, a rectifier, means connecting said gate winding, said rectifier and said load circuit in series and for energization from said supply circuit, means for energizing said control winding during inverse half cycles of voltage of said supply circuit to determine the portion of the forward half cycle of voltage of said supply circuit during which said reactor is saturated, a self-saturating inductor including a gate winding, circuit means connecting said last-mentioned gate winding in series with said load circuit and with said supply circuit and circuit means responsive to flux change in said reactor during the forward half cycle of voltage of said rectifier for establishing a reset flux in said inductor during said forward half cycle of voltage and thereby establish the instant in the succeeding half cycle that self saturation of said inductor occurs.

20. A magnetic amplifier arrangement for producing a full-wave output from a half-wave input control signal, comprising a source of alternating current, a first magnetic amplifier stage and a second magnetic amplifier stage so connected to said source as to be alternately conductive on successive half-cycles of said alternating current, a pair of output terminals common to said first and second stages, a load circuit connected across said pair of terminals, and connections to a source of control voltage for applying an input control signal solely to said first stage whereby said first stage delivers to said load an output voltage correlative to said control signal on the conductive half-cycle of said first stage, said first and second stages being so interconnected that the output voltage of said first stage controls the flux setting in said second stage whereby, during the conductive half-cycles of said second stage, said second stage delivers to said load an output voltage which has the same value as that delivered by the first stage on the preceding half-cycles of the alternating current source.

21. The arrangement of claim 20, wherein said connections include control winding means disposed in said first stage.

22. The arrangement of claim 21, wherein each of said stages includes saturable reactor means having load winding means wound thereon and unilateral conductive means connected in series with said load winding means, the unilateral conductive means being so poled that half-wave current flows through each of said stages on alternate half-cycles of said alternating current source.

23. A magnetic amplifier output stage for producing a full-wave output from a half-wave input comprising, in combination, a pair of half-wave magnetic amplifiers connected in cascade, a source of alternating current supplying operating potential to said amplifiers, said amplifiers including means whereby said amplifiers are alternately rendered conductive on successive half-cycles of said alternating current, a load common to said pair of amplifiers, and circuit connections for applying a half-wave input control signal solely to the first of said cascaded pair of amplifiers whereby said first amplifier supplies power to said load during its conductive half-cycles and the other of said amplifiers supplies power selectively under control of the output of said first amplifier to said load during its conductive half-cycles.

24. A magnetic amplifier comprising a half-wave magnetic amplifier driver stage having an output circuit, a half-wave magnetic amplifier slave stage having an output circuit, an alternating current source connected to alternately energize said stages on successive half-cycles thereof, circuit connections for applying a control signal solely to said driver stage, and circuit means including a load connected to the output circuits of said driver and slave stages whereby said stages directly deliver power to said load on alternate half-cycles of said alternating current source in response to the application of a control signal to said driver stage.

25. A full-wave magnetic amplifier having half-wave magnetic amplifier characteristics comprising, in combination, a source of alternating current, a half-wave magnetic amplifier driver stage and a half-wave magnetic amplifier slave stage connected to be alternately conductive on successive half-cycles of said source, means for applying a control signal solely to said driver stage, a pair of output terminals common to said driver and slave stages for receiving the outputs therefrom, a load connected between said terminals, and circuit connections for applying a portion of the output from said driver stage to said slave stage to thereby control the flux setting of said slave stage.

References Cited in the file of this patent

UNITED STATES PATENTS 2,653,293 Huge ---------------- Sept. 22, 1953
2,683,853 Logan ---------------- July 13, 1954